US009038485B2

(12) United States Patent
Lee et al.

(10) Patent No.: US 9,038,485 B2
(45) Date of Patent: May 26, 2015

(54) TORQUE SENSOR BEARING ARRANGEMENT AND METHOD

(71) Applicant: Schaeffler Technologies GmbH & Co. KG, Herzogenaurach (DE)

(72) Inventors: Brian Lee, York, SC (US); Sheng Qui, West Lafayette, IN (US); Steven Auslander, Fort Mill, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/172,081

(22) Filed: Feb. 4, 2014

(65) Prior Publication Data

US 2014/0219593 A1      Aug. 7, 2014

Related U.S. Application Data

(60) Provisional application No. 61/761,416, filed on Feb. 6, 2013.

(51) Int. Cl.
| | |
|---|---|
| *G01L 3/00* | (2006.01) |
| *F16C 41/00* | (2006.01) |
| *G01P 3/44* | (2006.01) |
| *G01P 3/488* | (2006.01) |
| *F16C 33/80* | (2006.01) |
| *F16C 33/58* | (2006.01) |

(52) U.S. Cl.
CPC .............. *F16C 41/007* (2013.01); *G01P 3/443* (2013.01); *F16C 33/80* (2013.01); *F16C 33/581* (2013.01); *F16C 33/586* (2013.01); *G01P 3/44* (2013.01); *G01P 3/488* (2013.01)

(58) Field of Classification Search
CPC ......... G01L 25/003; G01L 3/10; G01L 5/221; G01L 3/101; B62D 6/10; F16C 41/007; F16C 33/805; F16C 33/78; G01F 3/443
USPC ............. 384/448, 165, 446; 73/333, 802.335, 73/494, 862.28, 862.08
See application file for complete search history.

(56) References Cited

U.S. PATENT DOCUMENTS 5,026,178 A * 6/1991 Ballhaus ........................ 384/448
5,509,310 A * 4/1996 El-Ibiary ........................ 73/660

(Continued)

FOREIGN PATENT DOCUMENTS

JP          2009097896        5/2009

*Primary Examiner* — Lisa Caputo
*Assistant Examiner* — Nigel Plumb
(74) *Attorney, Agent, or Firm* — Volpe and Koenig, P.C.

(57) ABSTRACT

A torque sensor bearing arrangement for a shaft having first and second bearings, each with respective inner ring and outer rings with rolling elements therebetween. The bearings are located at first and second ends of the shaft. First and second sensing rings are connected to the outer rings of the bearings. First and second marking rings are connected to the inner rings, spaced apart from and aligned with the respective first and second sensing rings. The marking rings each have a wavy surface facing the respective sensing ring to form respective first and second sensors from the respective sensing ring—marking ring pairs. The sensors detect a rotational angle position of the shaft and provide a signal. A controller receives signals from the first and second sensors and calculates at least one of torque or an angular speed of the shaft based on signals from the first and second sensors.

12 Claims, 4 Drawing Sheets

(56) References Cited

U.S. PATENT DOCUMENTS

| | | | |
|---|---|---|---|
| 5,746,452 A * | 5/1998 | El-Ibiary et al. | 384/446 |
| 5,967,669 A * | 10/1999 | Ouchi | 384/448 |
| 5,979,248 A * | 11/1999 | Gloger | 73/862.28 |
| 6,700,367 B1 | 3/2004 | Santos et al. | |
| 7,281,424 B2 * | 10/2007 | Sakamoto | 73/494 |
| 7,493,831 B2 | 2/2009 | Varonis | |
| 2008/0285901 A1 | 11/2008 | Koike et al. | |
| 2010/0031756 A1 | 2/2010 | Mian et al. | |

* cited by examiner

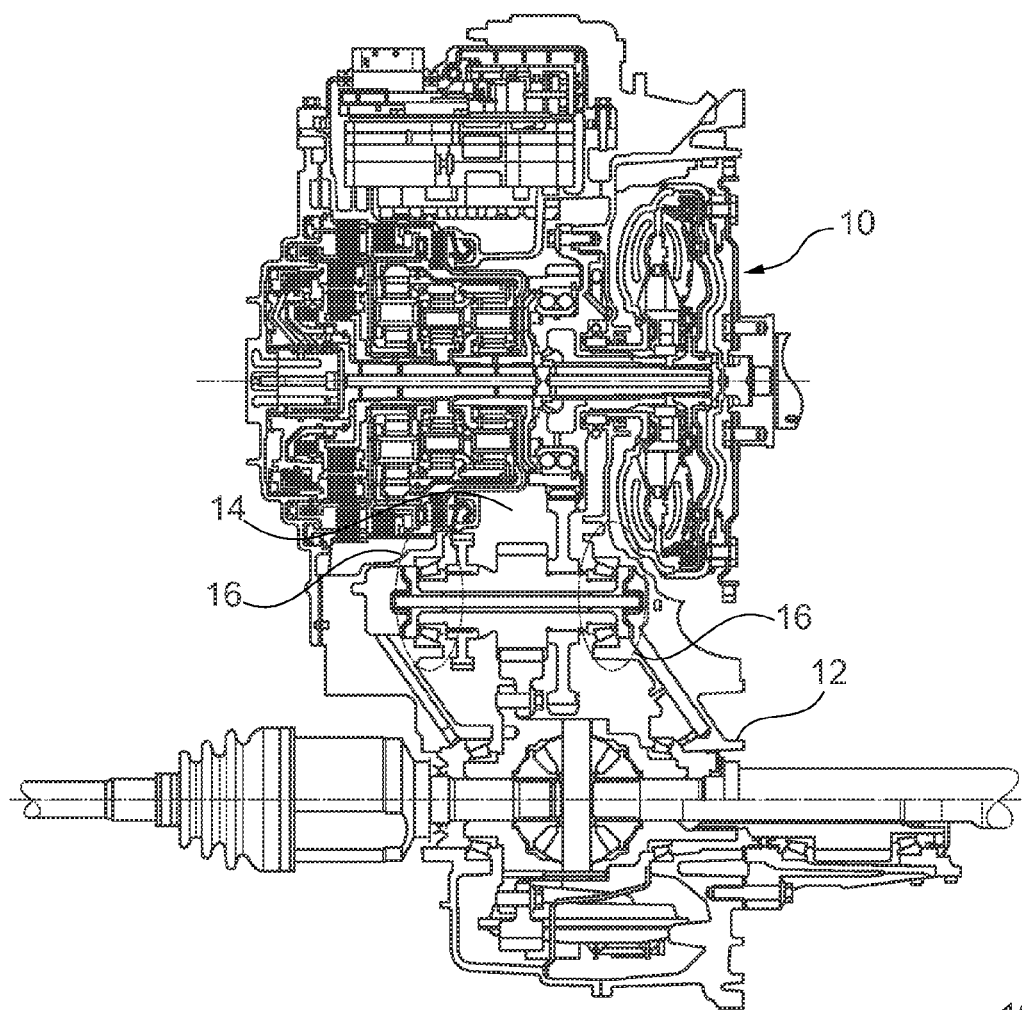
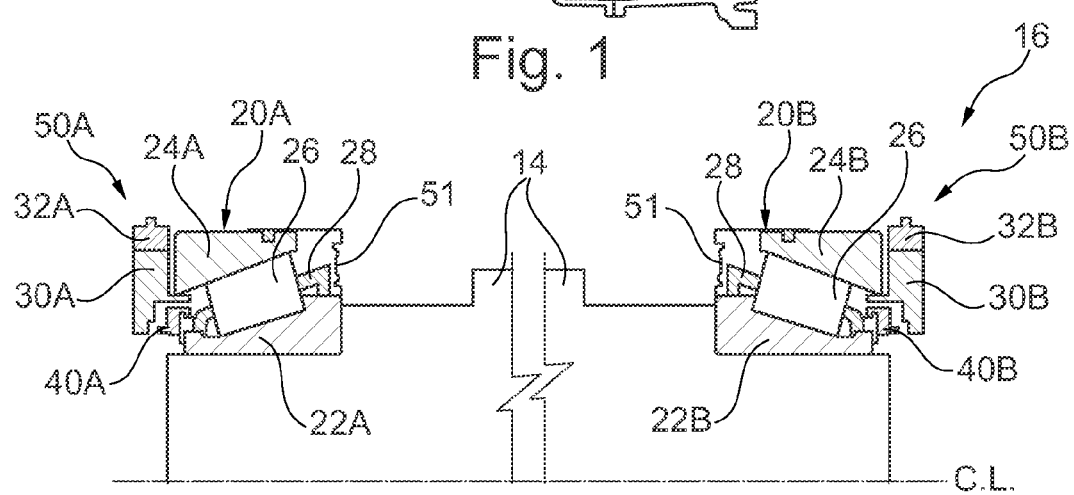

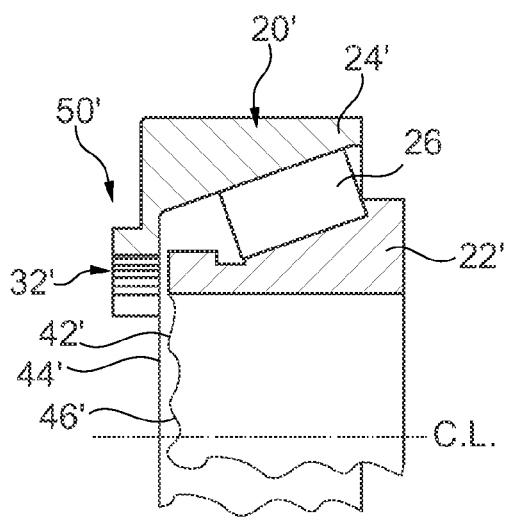
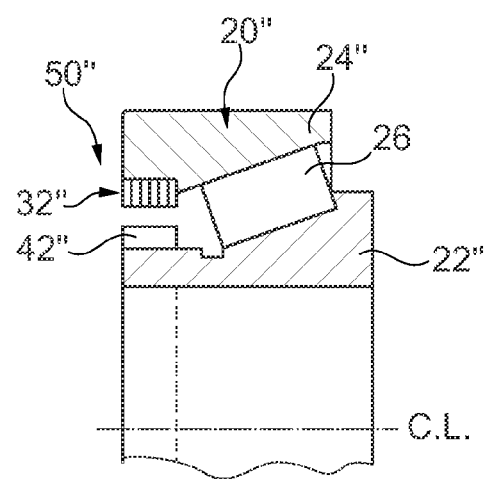
Fig. 7
Fig. 8

TORQUE SENSOR BEARING ARRANGEMENT AND METHOD

INCORPORATION BY REFERENCE

The following documents are incorporated herein by reference as if fully set forth: U.S. Provisional Application No. 61/761,416, filed Feb. 6, 2013.

FIELD OF INVENTION

The present invention relates to a bearing arrangement used to detect torque and angular speed of a supported shaft.

BACKGROUND

Bearing arrangements having sensors to detect a position of the bearing are known. One such arrangement, for example as provided in U.S. Pat. No. 5,026,178, uses a combination of magnets and Hall effect sensors in order to determine a rotation speed of a shaft or hub. However, the arrangement provided here requires a complicated assembly with magnetic elements connected to the cages holding the rolling elements between the inner and outer bearing rings. Further, multiple Hall effect sensors must be located at various positions between the inner and outer bearing rings. Additional examples of these types of sensors integrated into bearings using magnets with Hall effect sensors are disclosed in U.S. Pat. Nos. 6,700,367 and 5,967,669.

It is further known in the art to detect bearing vibrations using proximity probes, for example, as provided in U.S. Pat. No. 5,509,310. Additionally, torque sensing bearings using a magneto elastic ring that is press-fit onto the inner race is also known from U.S. Pat. No. 7,493,831.

The drawbacks associated with many of these known arrangements include complex assembly as well as higher costs. Further, depending on the application, such as in automotive systems, there are additional problems related to failures due to contamination in use. Additionally, such sensor arrangements in bearings operating as a magnetic Hall effect sensor have low sensitivity and generally cannot operate at high frequencies required, for example, that are necessary to track the high speeds of rotating elements in automobile engines and/or transmissions. Further, the sensors used in such prior known bearings become disrupted when debris and lubricant contamination enter into them.

There has been an increased need in the automotive field for tracking the torque and speed of various shafts used in engines and transmissions in order to allow for greater engine control for improved economy and reduced fuel consumption. Further, for example in automatic transmissions, additional data is required in order to reduce the shift harshness often encountered during shifting based on the current shift parameters used by the ECM or TCM particularly with the increased use of more gear ratios, for example nine or ten speeds in the automatic double clutch transmissions currently entering the market.

SUMMARY

A torque sensor bearing arrangement is provided in which a pair of sensor bearings is assembled at either end of the intermediate transfer shaft in a vehicle transmission. The sensors are used to determine a twist of the shaft between the bearings, and from this the torque and angular speed of the shaft of known dimensions can be calculated.

In one arrangement, torque sensor bearing arrangement for the shaft is provided with first and second bearings, each having a respective inner ring and outer ring with rolling elements therebetween. The bearings are located at first and second ends of the shaft. First and second sensing rings are connected in proximity to the outer rings of each of the bearings. These sensing rings each include an inductive sensor. First and second marking rings are connected to one of the shaft or inner ring, spaced apart from and aligned with the respective first and second sensing rings. The marking rings each have a wavy surface with a plurality of projections with valleys therebetween facing the respective first and second sensing ring to form respective first and second sensors from the respective sensing ring-marking ring pairs. One of these first and second sensors is located at each end of the shaft in order to detect a rotational angle position of the shaft based on the wavy surface proximity and provide a signal. A controller receives the signals from each of the first and second sensors and calculates at least one of a torque or an angular speed of the shaft based on the signals from the sensors.

To determine the relative position or each bearing, rotation of the wavy ring is measured by the inductive sensor which is preferably a high-frequency analog inductive proximity sensor in the sensing ring. As the wavy ring passes the inductive sensor, the sinusoidal distance between the sensor and the ring are measured. Speed can be calculated as a derivative of the tangential movement over time. Torque can be calculated from the rotation delay between the bearings.

In order to provide a precise detection of the position of the inner bearing ring of each of the bearings relative to the outer bearing ring, each of the projections of the wavy surface of the marking ring preferably has a different shape, and the inductive sensor detects proximity of the projections form which the controller can determine an exact position. These different shapes can be a different height, slope, or circumferential spacing, or combinations thereof. Utilizing the signals from the inductive sensor at a particular position, as well as possible before and after a particular position, the precise position of the inner ring as well as the shaft connected to the inner ring at each of the first and second bearings can be determined.

In one's aspect of the invention, the sensing rings are incorporated into the outer bearing rings. Additionally, it is possible for the marking rings to be incorporated into the inner bearing rings. It is also possible to apply the sensing ring and marking ring as separate rings that are connected to or in proximity to the inner and outer bearing rings.

In one preferred arrangement, a labyrinth seal is formed by facing surfaces of the sensing ring and the marking ring for each of the sensors. It is also possible to provide additional seals in order to reduce and/or prevent contamination of the bearing rolling elements.

Preferably, in these arrangements, the first and second sensing rings are held in a fixed position and the marking ring is rotated with the moving element.

In another aspect, a bearing with an integrated rotary encoder is provided. Here, the bearing includes an inner bearing ring, an outer bearing ring, and rollers located therebetween. An inductive sensor is provided at a first angular position in one of the inner or outer bearing rings. A wavy surface including a plurality of projections with valleys therebetween is located on the other of the inner and outer bearing rings. The inductive sensor is adapted to detect the proximity of the wavy surface and send a position signal.

Preferably, each of the projections has a different shape so that a rotary position of the inner ring relative to the outer ring can be determined by the inductive sensor detecting a proximity of the projections as they pass the inductive sensor at the fixed first angular position. Here, the inductive sensor is preferably integrated into one of the inner and outer bearing rings, the wavy surface is preferably formed on the other of the inner and the outer bearing rings. However, they can also be separate parts that are connected to or assembled with the inner and outer bearing rings and/or the rotating element and housing for which a rotary position of the rotating element is desired.

In one aspect, a torque measuring system is provided for an automatic transmission in order to allow for greater control of gear selection and clutch shifting events. In this case, the bearing arrangement is integrated with an intermediate transfer shaft in the transmission assembly of a motor vehicle.

BRIEF DESCRIPTION OF THE DRAWINGS

The foregoing Summary and the following detailed description will be better understood when read in conjunction with the appended drawings, which illustrate a preferred embodiment of the invention. In the drawings:

FIG. 1 is a schematic view of a transmission with an intermediate shaft on which one preferred embodiment of the torque sensor bearing arrangement according to the invention is integrated.

FIG. 2 is an enlarged view showing the intermediate shaft of FIG. 1 with the first and second bearings and respective sensors according to the invention.

FIG. 7 is a cross-sectional view of an alternate arrangement of a bearing having an integrated sensing ring and marking ring on a first axial side.

FIG. 8 is a cross-sectional view of a bearing having an integrated sensing ring and marking ring integrated on radial surfaces of the inner and outer rings.

DETAILED DESCRIPTION OF THE PREFERRED EMBODIMENTS

Figure 3:
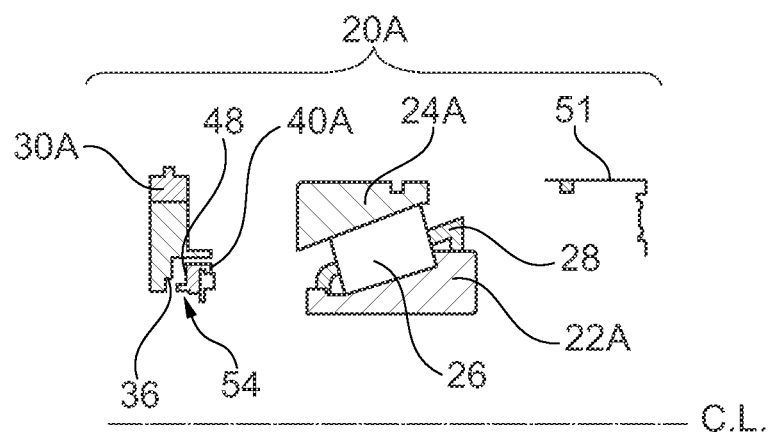
FIG. 3 is an exploded view showing the assembly of a bearing with a marking ring and sensing ring as well as an optional seal according to the invention.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Referring now to FIG. 1, a schematic view showing a transmission 10 along with a transaxle 12 used in a front wheel drive vehicle is shown. Between the transmission and the transaxle 12, an intermediate transfer shaft 14 is used to transfer torque from the transmission 10 to the differential of the transaxle 12 where power is then carried by the half shafts to the wheels (not shown).

Referring to FIG. 2, a torque sensor bearing arrangement 16 for the shaft 14 is shown. The torque sensor bearing arrangement 16 includes first and second bearings 20A, 20B, each having a respective inner ring 22A, 22B and an outer ring 24A, 24B, with rolling elements 26 therebetween. The bearings 20A, 20B are located at first and second ends of the shaft 14. The bearing rings 22A, 22B; 24A, 24B as well as the rollers 26 are preferably made of bearing grade tool steel which can be hardened, as will be known by those skilled in the art. A cage 28 is used to hold the rollers 26 in spaced apart positions and can be made from any suitable metallic or polymeric material. The rolling elements 26 can be tapered rollers, straight rollers, or spherical balls.

Still with reference to FIG. 2, first and second sensing rings 30A, 30B are connected in proximity to the outer rings 24A, 24B of each of the bearings 20A, 20B. The sensing rings 30A, 30B each include an inductive sensor 32A, 32B. The inductive sensors 32A, 32B are preferably high-frequency analog inductive proximity sensors formed with an induction coil that can be used in order to provide a signal to a controller 60, explained in further detail below. The sensing rings 30A, 30B can be connected directly to the outer rings 24A, 24B of the bearings 20A, 20B or can be connected to the structure, such as a bearing seat or housing adjacent to the ends of the shaft 14. The inductive sensors 32A, 32B include wires 34 shown in FIG. 4 by which a signal can be transmitted from the sensors 32A, 32B.

Figure 4:
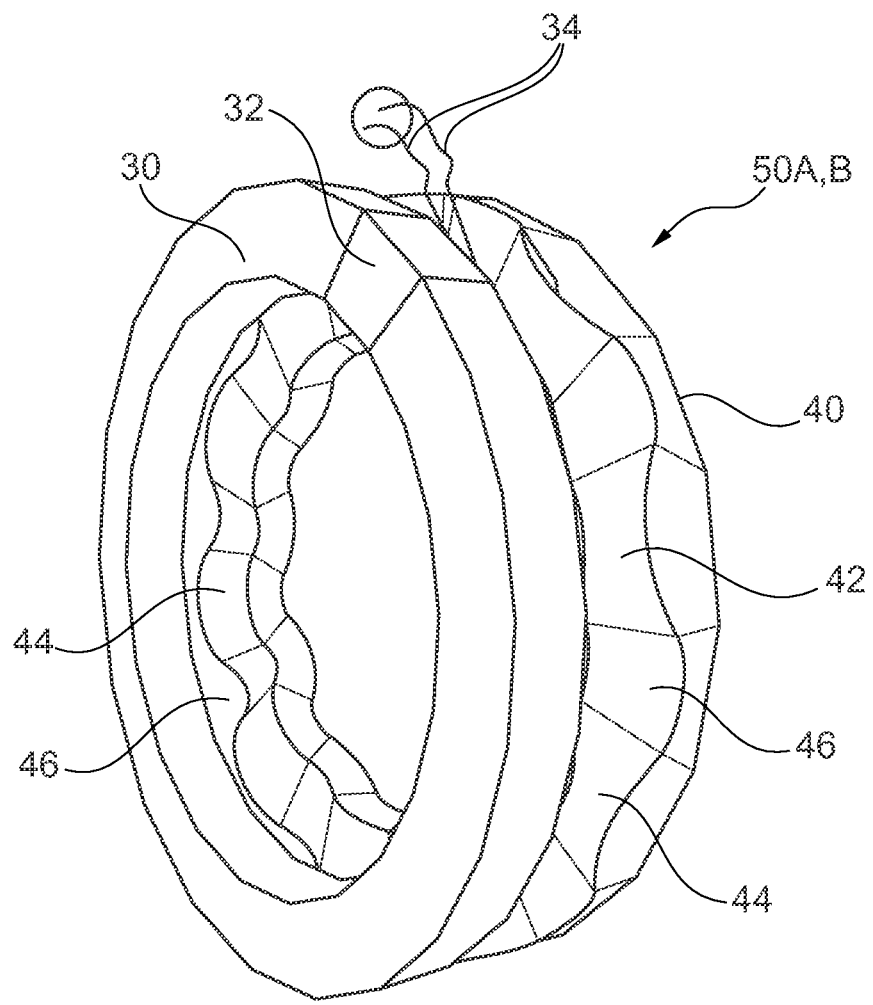
FIG. 4 is an enlarged perspective view showing an embodiment of a sensing ring and a marking ring.

Referring to FIGS. 2 and 4, first and second marking rings 40A, 40B are connected to one of the shaft 14 or, more preferably, the inner ring 22A, 22B of the bearings 20A, 20B, and are spaced apart from and aligned with the respective first and second sensing rings 30A, 30B. The marking rings 40A, 40B each have a wavy surface 42 (shown in FIG. 4) with a plurality of projections 44 with valleys 46 therebetween facing a respective first or second sensing ring 30A, 30B to form respective first and second sensors 50A, 50B. The first and second sensors 50A, 50B are positioned at each end of the shaft 14 or at least at or outside an effective end of the torque transmitting length of the shaft defined between the torque input and torque output positions. The first and second sensors 50A, 50B detect the rotational angle position of the shaft 14 and each provide a signal.

As shown in FIG. 4, each of the projections 44 of the wavy surface 42 of the marking ring 40A, 40B has a different shape. This can be a different height, different slope, or different angular phase lengths in the circumferential direction, or a combination thereof. These inductive sensors 32A, 32B detect a proximity of the projections 44 and, based on the difference in proximity based on a height, slope or angular phase of the projections, as well as possibly proximity measurements before and after the instant measurement, provide a signal from which the controller 60 can determine an angular position of the marking rings 40A, 40B relative to the respective sensing rings 30A, 30B.

The controller 60 receives the signals from each of the first and second sensors 50A, 50B and also calculates at least one of torque or an angular speed of the shaft 14 based on the signals from the first and second sensors 50A, 50B. Here, the controller 60 is preferably configured to calculate the torque on the shaft 14 based on a difference in angular phase position between the sensors. The controller 60 is configured to calculate the torque of the shaft as follows:

$$T = \frac{J_T}{L} \times G \times a$$

where $J_T$ is a torsion constant determined by a size and shape of the shaft (and equals $(PI*D^4)/32$ for a solid, round shaft), L is a torque effective length of the shaft (or the shaft length between gear sets), G is a shear modulus determined by a material of the shaft, and a is a twist angle of the shaft.

The controller 60 is preferably also configured to calculate the twist angle of the shaft by a rotational phase difference from both of the ends of the shaft 14 as provided by the signals from the first and second sensors 50A, 50B. Further, the controller 60 is configured to calculate an angular speed of the shaft as a derivative of tangential movement of the shaft over time. Preferably, at least one of the torque or angular speed of the shaft 14 can be used by the ECM or TCM in order to improve shifting of the transmission by the ECM and/or TCM using this data in addition to engine speed or other date used to determine an appropriate shifting parameter.

With reference to FIG. 3, one of the bearings 20A is shown in cross-section in an exploded view showing how the individual parts including the sensing ring 30A and marking ring 40A can be assembled to the bearing inner and outer rings 22A, 24A. Further, an optional seal 51 can be provided on an opposite axial side of the bearing 20A from the sensor arrangement. Further, as shown in FIG. 3, the sensing ring 30A can include a labyrinth surface 36 on one axial end which faces the marking ring 40A which includes a corresponding complementary labyrinth surface 48 in order to provide a labyrinth seal to prevent the ingress of dirt and debris into the rolling elements 26 of the bearing 20A from the sensor side.

Figure 5:
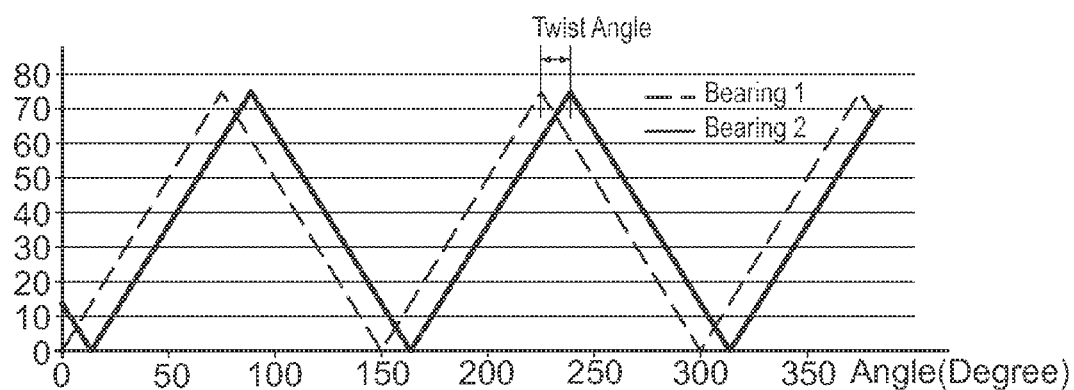
FIG. 5 is a graph showing the signals from the first and second sensors located at either end of the shaft from which a twist angle of the shaft can be determined.

Referring to FIG. 5, one example of a twist angle calculation is provided by comparing the rotational phase difference from the sensors 50A, 50B from the bearings 20A, 20B at both ends of at least the effective length of the shaft 14. In order to ensure the accuracy of the speed and torque measurements, the inductive sensors 32 are high quality analog inductive proximity sensors. In order to improve the quality of the signal and the accuracy of the measurements, the following factors can be adjusted: the density of the signals based on the number and size of the projections, as well as the difference in shape of the projections. Here, the high frequency sensors 32 can capture enough signals to generate a continuous change of the marking sensor distance (the distance between the wavy surface 42 and the active surface of the sensor 32). As the configuration of the wavy surface 42 is known, this can also be used in addition to the analog sensor tracking since the corresponding mark-sensor distance to the rotational phase of the ring is known. This data is analyzed by an analyzing circuit in order to read the change of distance and output of rotational phase. Since two separate signals are provided from the first and second sensors 50A, 50B, it is possible to determine torque via the change in twist angle at the same moment in time as shown in FIG. 5.

Figure 6:
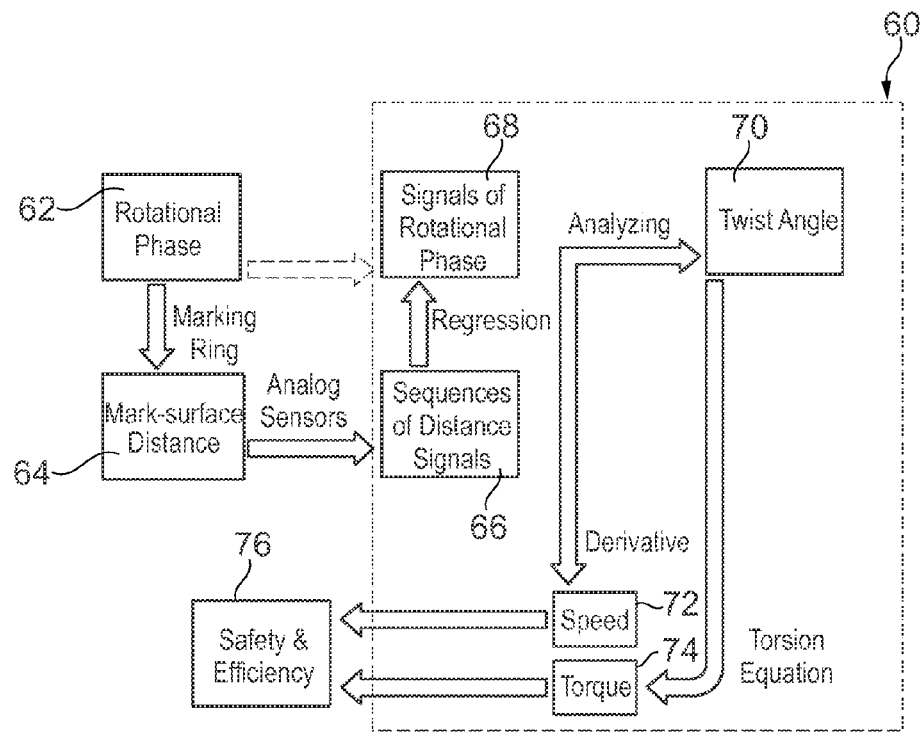
FIG. 6 is a flow diagram showing how the system determines a twist angle, speed, and torque using the sensor arrangement according to the invention.

Referring to FIG. 6, the logic for the controller 60 is shown that takes the inputs of the physical motion of the shaft as captured by the first and second sensors 50A, 50B and outputs the torque and angular rotational speed of the shaft. As shown in box 62, the rotational phase of the shaft is determined by the marking ring 40A, 40B and is transferred to a mark-surface distance via the sensing ring 30A, 30B as shown in box 64. Sequences of distance signals are captured and transmitted to the controller 60 as shown in box 66 where they are converted to signals of rotation phase. These are analyzed via the controller to determine the twist angle as shown in box 70. Speed is determined via the derivative of the change in angular position per unit time as indicated at box 72 and the torque is calculated as shown at box 74. This information can be output to an ECM or TCM as indicated at box 76 in order to improve safety as well as increase efficiency.

Referring to FIG. 7, an alternate embodiment of a bearing 20' is provided with an integrated rotary encoder as the sensor 50'. Here the inner bearing ring 22', outer bearing ring 24' and rollers 26 are generally the same as above. An inductive sensor 32' is provided at a first angular position on one of the inner or outer bearing rings 22', 24', here the outer ring 24'. A wavy surface 42', including a plurality of projections 44' and valleys 46' is provided on the other of the inner and outer bearing rings 22', 24', here the inner ring 22'. The inductive sensor 32' is adapted to detect the proximity of the wavy surface 42' and send a position signal based on the proximity detection. Preferably, each of the projections 44' has a different shape so that a rotary position in the inner ring 22' relative to the outer ring 24' can be determined. Preferably, the inductive sensor 32' is integrated into one of the inner and outer bearing rings 22', 24'. Here, the inductive sensor 32' is shown integrated into the outer bearing ring 20'. The wavy surface 42' is formed on the inner bearing ring 22'. In the embodiment of FIG. 7, the wavy surface 42' is formed on an axial end of the inner ring 22'. However, it is possible to provide other configurations. For example, as shown in FIG. 8, a bearing 20" is shown with a sensor 50". Here, the bearing includes the inner ring 22", the outer ring 24" and rollers 26. The inductive sensor 32" is integrated into the outer bearing ring 24" and the wavy surface 42" is integrated into the inner bearing ring 22". Here, the wavy surface 42" extends radially from the inner bearing ring 22" and faces the inductive sensor 32" which is located on a radially inner surface of the outer bearing ring 24".

The sensors according to the invention can be used in the torque sensing bearing arrangement 16 or as separate rotary encoders for various other types of uses.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A torque sensor bearing arrangement for a shaft, comprising:
   first and second bearings, each having a respective inner ring and outer ring with rolling elements therebetween, the bearings located at first and second ends of the shaft;
   first and second sensing rings connected in proximity to the outer rings of each of the bearings, the sensing rings each include an inductive sensor;

first and second marking rings connected to one of shaft or inner ring, spaced apart from and aligned with the respective first and second sensing rings, the marking rings each having a wavy surface with a plurality of projections with valleys therebetween facing the respective first or second sensing ring to form respective first and second sensors from the respective sensing ring—marking ring pairs, with one of the first and second sensors at each end of the shaft detecting a rotational angle position of the shaft based on the wavy surface proximity and each provide a signal; and a controller that receives the signals from each of the first and second sensors and calculates at least one of torque or an angular speed of the shaft based on signals from the first and second sensors, wherein each of the projections of the wavy surface of the marking ring has a different shape, and the inductive sensor detects a proximity of the projections from which the controller can determine an exact position.

2. The torque sensor arrangement of claim 1, wherein the controller is configured to calculate the torque of the shaft based on a difference in position between the sensors.

3. The torque sensor arrangement of claim 2, wherein the controller is configured to calculate the torque of the shaft as $$T = \frac{J_T}{L} \times G \times a$$

where $J_T$ is a torsion constant determined by a size and shape of the shaft, L is a torque effective length of the shaft, G is a shear modulus determined by a material of the shaft, and α is a twist angle of the shaft.

4. The torque sensor arrangement of claim 3, wherein the controller is configured to calculate the twist angle of the shaft by a rotational phase difference from both of the ends of the shaft.

5. The torque sensor arrangement of claim 1, wherein the controller is configured to calculate an angular speed of the shaft as a derivative of tangential movement of the shaft over time.

6. The torque sensor arrangement of claim 1, wherein the sensing rings are incorporated into the outer bearing rings.

7. The torque sensor arrangement of claim 6, wherein the marking rings are incorporated into the inner bearing rings.

8. The torque sensor arrangement of claim 1, further comprising a labyrinth seal formed by facing surfaces of the sensing ring and the marking ring for each of the sensors.

9. The torque sensor arrangement of claim 1, further comprising a seal connected to each of the outer bearing rings and extending to the inner bearing ring on an opposite axial side of each of the bearings from the first and second sensors.

10. The torque sensor arrangement of claim 1, wherein the first and second sensing rings are in fixed positions.

11. A bearing with an integrated rotary encoder, comprising:
    an inner bearing ring, an outer bearing ring, and rollers located therebetween;
    an inductive sensor provided at a first angular position in one of the inner or outer bearing rings;
    a wavy surface including a plurality of projections with valleys therebetween located on the other of the inner and outer bearing rings, the inductive sensor being adapted to detect a proximity of the wavy surface and send a position signal, and each of the projections has a different shape so that a rotary position of the inner ring relative to the outer ring can be determined.

12. The bearing of claim 11, wherein the inductive sensor is integrated into the one of the inner and the outer bearing rings, and the wavy surface is formed on the other of the inner and the outer bearing rings.

* * * * *